March 8, 1955  R. ENGELHARDT ET AL  2,703,857
CAPACITOR
Filed Dec. 31, 1949  2 Sheets-Sheet 1
FIG.1.
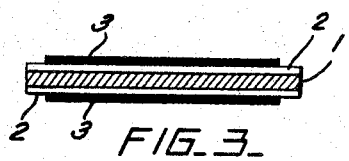
FIG.3.
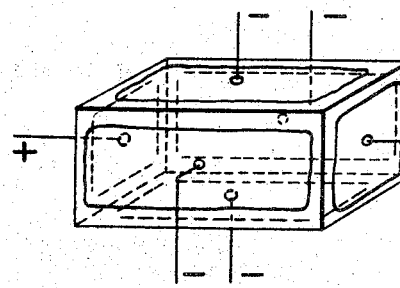
FIG.5.
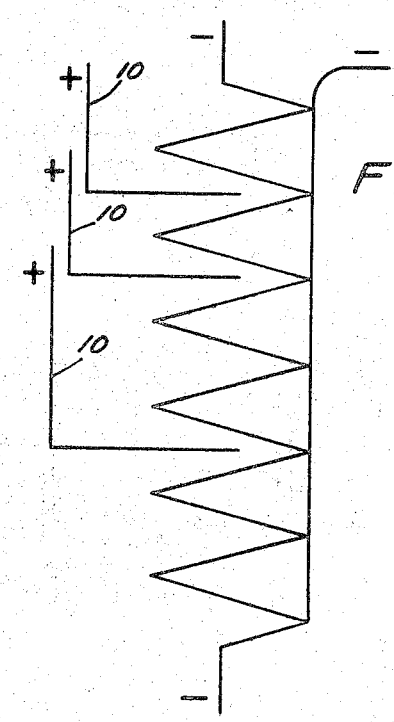
FIG.7.
FIG.2.
FIG.4.
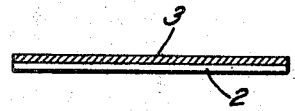
FIG.6.
INVENTORS
RUDOLF ENGELHARDT
HANNS ARLEDTER
BY Burgess and Dinklage
ATTORNEYS

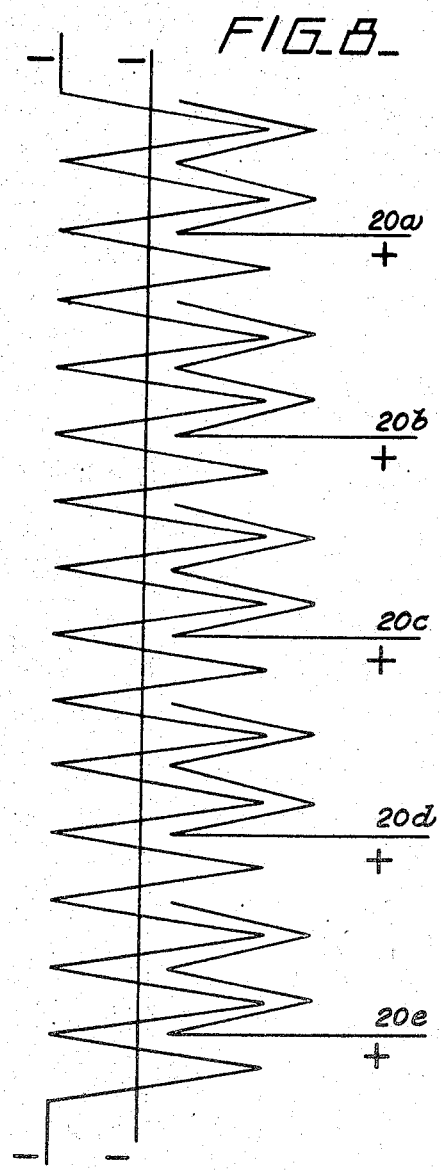
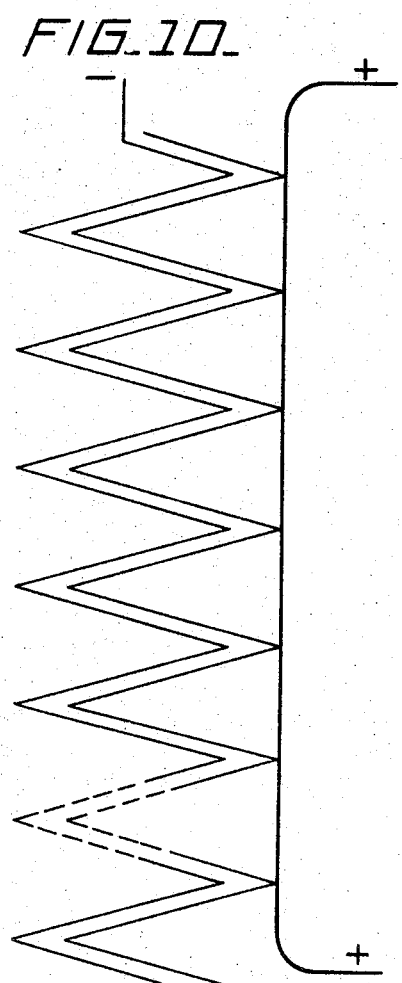
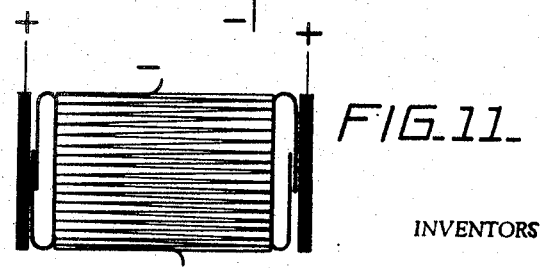

United States Patent Office 2,703,857
Patented Mar. 8, 1955

2,703,857

CAPACITOR

Rudolf Engelhardt, Leverkusen-Bayerwerk, and Hanns Arledter, Koln-Kalk, Germany, assignors to Farbenfabriken Bayer Aktiengesellschaft, Leverkusen, Germany, a corporation of Germany Application December 31, 1949, Serial No. 136,286

Claims priority, application Germany July 25, 1949

1 Claim. (Cl. 317—261)

In our U. S. Patent No. 2,593,829, foils for electrical equipment are described, in particular foils for capacitors consisting of a metal foil serving as carrier, said foil being coated at least on one side with an adhesive dielectric plastic layer, the latter being coated with a second metallic coating.

This invention relates to a capacitor essentially consisting of a foil as described in U. S. Patent No. 2,593,829, with this foil being folded in a zigzag-like manner.

Capacitors constructed in accordance with the present invention completely avoid the difficulties of contacting as are met with on using such foils for the usual cylindrical or flat windings.

For illustrating the invention in the following some details are given as to the construction of a capacitor made of a metal foil to be used as carrier serving as electrode, said carrier being coated on one side with an adhesive dielectric plastic layer, the latter being coated with a second metallic layer serving as counter-electrode. A metal foil of, for instance, 5–8µ thickness and, for instance, 50 mm. breadth, made of, for instance, aluminium or tin is coated on one side with a dielectric plastic layer of, for instance, 2–10µ thickness according to the usual processes, as for instance, by casting. Upon this plastic layer a metal layer of, for example, aluminium, silver, copper or cadmium of 0.2–1µ thickness is applied, preferably by vaporization. The margins of the metal foil coated with a plastic must be kept free from the metal vaporized upon the foil in order to avoid short circuit taking place between the metal foil and the vaporized metal coating, since the metal foil and the metal coating are separated at the edges by only a few microns. In order to avoid the margins being coated with metal the margins are covered, e. g. with plates, or greased prior to vaporization and the plates or the grease bearing the metal coating are subsequently removed. The ends of the foil are preferably also kept free from the second metallic layer. The breadth of the margins to be kept free depends on the voltage with which the capacitor is to be charged. For working voltages up to 500 volts 2 mm. breadth of the non-metallized margin will suffice. The areas at the ends of the foil not to be metallized may be ¼ to ½ fold of the breadth of the fold but may also be broader.

Figure 1 is a cross section of the foil.

Figure 2 is a schematic section through a foil as shown in Figure 1, in which the various possibilities of contacting are indicated.

Figure 3 is a cross section of a foil having two plastic layers, and being metallized on both sides.

Figure 4 is a schematic section through a foil as shown in Figure 3, in which the various possibilities of contacting are indicated.

Figure 5 shows a capacitor block in the pressed state, indicating the possibilities of contacting.

Figure 6 is a cross section through a contact strip.

Figure 7 is a schematic section through a zig-zagged foil. Various possibilities of contacting are indicated especially contacting by an inserted contact strip as shown in Figure 6.

Figure 8 shows a similar schematic section through a zig-zag foil as in Figure 7 in which the various possibilities of contacting are indicated, especially contacting with a number of inserted contact strips.

Figure 9 is a double folded foil having the metal layer on the outside.

Figure 10 is a schematic section through a zig-zagged foil wherein contacting is performed by the insertion of a zig-zagged bent foil as shown in Figure 9.

Figure 11 shows a cross section through a capacitor block in which contacting is effected between the metal contact surface of the zig-zagged foil and the positive terminals by the interposition of a folded metallized foil having the metal on the outwardly bent surface.

Fig. 1 shows a cross-section of the foil, 1 is the metal carrier foil, 2 the dielectric plastic layer, 3 the narrower vaporized metal layer. The foil is zigzag-like folded in accordance with Fig. 2 and pressed together. One contact is applied to the bendings where the vaporized metal layer lies free and the second contact is effected at the other bendings where the metal carrier foil lies free. Of course, the second contact can also be produced at the longitudinal edges. Contacting can also be provided at the free ends of the foil. Contacting is accomplished, for instance, by metallizing or soldering. In order to reduce the danger of the capacitor breaking down it is advisable to apply thicker lacquer layers (for instance by 2–4µ) to the areas of the foil weakened by bending. Contacting can likewise be effected by interposing thin metal foils of, for instance, 5µ thickness which are, for instance, laminated upon the capacitor-foil.

Constructing of a capacitor from one foil comprising a metal carrier foil coated on both sides with a plastic layer upon which a second metal layer is applied in accordance with Fig. 3 wherein the references have the same meaning as in Fig. 1, is substantially accomplished in the following manner. One contact is provided at the longitudinal edges where the metal carrier foil serving as electrode lies free and further contacts are produced at each bending where the vaporized metal layers—the counter-electrodes—are free. One contact each may be produced at the free ends of the foil as is shown in Fig. 4. Fig. 5 shows a capacitor block in a pressed state indicating the possibilities of contacting for the conductance of the negative and positive pole. It is also possible to contact one metallized layer as positive and the other metallized layer as negative pole.

Since two capacitor-systems are combined in one capacitor according to the invention, owing to the lacquer layer being applied to both sides and the special contacting of three conductive metal coatings the possibility of connecting either in series or in parallel is given. The multiple field of application offered thereby means a further technical advantage of the capacitor described herein.

According to a preferred method of this invention whereby weak spots are healed so that the application of a thicker dielectric layer upon the bendings can be dispensed with, contacting is produced by contact strips, as, for example, in the following manner. A thin capacitor-paper or a plastic foil is metallized in known manner, for instance, by vaporizing thereon a thin metal coating of 0.2–1µ thickness and this metallized support is used as contact strip for deriving or supplying current. In Fig. 6 wherein the references have the same meaning as in Fig. 1, 2 may also mean a paper foil. These contact-strips as shown in Fig. 7 are zigzag-like bent and inserted at the bendings between the likewise zigzag-like bent capacitor foil in such a manner that the vaporized metal layers are intimately contacted. Thus it is possible to interpose a contact strip 10 at each bending or alternately for example at each third, fifth or ninth bending, as shown in Fig. 7. Furthermore, it is possible to interpose on one block several contact strips such as 20a, 20b, 20c, 20d and 20e, as shown in Fig. 8. For example, an aluminium foil, provided with lacquer layers on both sides unto which counter-electrodes are evaporated, is zigzag-like folded in such a manner that 100 bendings are formed. Over 10 bendings each there are inserted 10 folded individual contact strips.

It is also possible to use one unilaterally metallized foil with the metal layer outwardly doublefolded and subsequently bent zigzag-like which is contacted with the vaporized metal layer all over the length of the capacitor and is also contacted on the outward bending (see Fig. 9 wherein 2 and 3 have the same meaning as in Fig. 6, and Fig. 10).

This kind of self healing-contacting is especially suited for manufacturing large-sized capacitors. For instance, by folding 100 m. of a capacitor foil the insulating layer of which is 8–10µ thick to form a capacitor block of 5 x 5 x 5 cm. size, capacitors which can be charged with about 1000 volts and which possess a capacity of 30–40 microfarads are obtained. As an example of this, see Fig. 11. Contacting of the metal carrier foil at the longitudinal edges is effected, for instance, by metallizing or soldering. The pressed capacitor block can be housed, for instance, in a plastic casing wherein the electrodes and the capacitor foil are contacted, for instance, by pressing the metal surfaces by spring pressure. In order to keep the capacitor capable of self-healing a metallized paper or plastic foil may be inserted between the metal contact surface and the bending contact surface.

According to the present invention a substantially non-inductive capacitor can be constructed. This may also be achieved if no additional dielectrics are used. It is possible to cover the finely vaporized metal layer subsequently with a wax- or an oil-like impregnating agent for protecting this layer against corrosion. The folds, i. e. the distance from one bending to the other, may be as broad as desired. The narrower they are the less are the conduction losses. The capacitor packs are surrounded by an insulating material, e. g. they may be installed in boxes of appropriate dimensions and of suitable materials, such as insulated sheet metal, impregnated cardboard or glass, or they may be jacketed with plastics. When inserting the somewhat loose capacitor packs, for instance, into beakers, fitting plates with clamping devices, for instance, springs, are used. The housing accomplished, for instance, by spraying with a plastic so that the plastic, e. g. Cellit (acetyl cellulose), polystyrene, formaldehyde phenol condensation products or the like, also covers the outside areas of the capacitor, provides in a simple manner that the foil pack is not deformed. The plastic casing is the expedient process for the type of capacitor described herein.

We claim:

A capacitor comprising a metal foil completely coated on both sides with adhesive dielectric plastic layers, said layers being coated with a second, narrower, vaporized metal layer, said second layers being positioned so that both the margins of said plastic coated metal foil are substantially free therefrom, said foil being zigzag-like folded a multiple number of times, and having one contact connected to the edge of the metal carrier foil and another contact connected to one of the outer vaporized metal layers by inserting a unilaterally metallized zigzag-like folded foil between the capacitor foil, the metallized side of said foil being outwardly folded, and including a contact connected to at least one of the other metal parts of the capacitor.

References Cited in the file of this patent

UNITED STATES PATENTS

| | | |
|---|---|---|
| 2,088,949 | Fekete | Aug. 3, 1937 |
| 2,223,833 | Sander | Dec. 3, 1940 |
| 2,262,791 | Bransford | Nov. 18, 1941 |
| 2,463,765 | Grouse | Mar. 8, 1949 |
| 2,552,306 | Beverly | May 8, 1951 |

FOREIGN PATENTS

| | | |
|---|---|---|
| 110,916 | Australia | July 11, 1940 |
| 483,480 | Great Britain | Apr. 19, 1938 |
| 562,821 | Great Britain | July 18, 1944 |
| 573,398 | France | Mar. 10, 1924 |